United States Patent Office 3,078,253
Patented Feb. 19, 1963

3,078,253
COMPOSITION COMPRISING A POLYESTER AND A RING MEMBER CONTAINING TWO PAIRS OF CONJUGATED ETHYLENIC LINKAGES, METHOD OF CROSS LINKING SAME AND CROSS-LINKED PRODUCT
Richard E. Davies, Ridgewood, N.J., and Leonard J. Rosen, Pasadena, Calif., assignors, by mesne assignments, to Marco Chemical Corporation, Linden, N.J., a corporation of New Jersey
No Drawing. Filed June 3, 1957, Ser. No. 662,977
16 Claims. (Cl. 260—45.4)

This invention relates to the cross linking of unsaturated polymers and more particularly to the cross linking of chain polymers containing ethylenic unsaturation and containing carbon atoms doubly bonded to oxygen atoms.

It is known that certain general properties of polymers are related to the spatial structure of the macromolecules which compose them and that polymers may generally be divided into chain polymers, which are generally thermoplastic in nature and space polymers, which are generally thermosetting.

Chain polymers may be linear in that the individual atoms are aligned or linear in that the individual monomeric units are aligned. Chain polymers may also be branched, but the branches on such polymers are each linked to only one linear chain.

In a space polymer a plurality of chains is cross linked to form a three dimensional network of much higher molecular weight than the individual chains. In addition to being thermosetting, space polymers are generally insoluble in all solvents.

It is often desirable to have a polymer which has a chain structure at an intermediate stage in the manufacture of a useful product and which has a space structure in the final manufacture. This takes advantage of the solubility or moldability of the chain polymer during fabrication but produces a product of high strength and stability. In order to change a chain polymer to a space polymer, a cross linking agent is used.

One of the most useful classes of polymers are the polyesters which are condensation products of a polycarboxylic acid and a polyhydroxy alcohol. To obtain a chain polymer, it is necessary to use a dicarboxylic acid or an anhydride thereof, and a dihydroxy alcohol. Cross linking of polyesters is generally obtained by incorporating some ethylenic linkages in the chain and then copolymerizing the chain with an ethylenically unsaturated material in the presence of a polymerization catalyst. For example, in a polyester of phthalic anhydride and 1,2-propylene glycol, a portion of the phthalic anhydride may be substituted by maleic anhydride to introduce ethylenic unsaturation in the chain and the polyester may then be blended with styrene. When cross linking is desired, a polymerization catalyst, such as benzoyl peroxide, is added and the mixture is heated to produce the space polymer.

The aforementioned procedure is disadvantageous in that it requires the addition of a catalyst before cross linking can take place and in that a mixture containing a catalyst begins to undergo cross linking even below the preferred cross linking temperature. Thus, a mixture containing a catalyst cannot be stored for any appreciable time and it is therefore difficult to adapt the process to mass production methods.

It is an object of this invention to provide a novel method of cross linking chain polymers containing ethylenic unsaturation and containing carbon atoms doubly bonded to oxygen atoms and particularly polyester chain polymers containing ethylenic unsaturation.

Still another object of this invention is to provide novel cross linked polymers which are obtained by the novel method of cross linking.

These and other objects are accomplished by the present invention.

In accordance with the present invention a cross linked polymer is obtained comprising a plurality of chains containing carbon and oxygen atoms, said chains being linked together by a structure including cyclohexene rings, each of said rings including two adjacent carbon atoms on one of said chains, at least one of which carbon atoms being also adjacent to a carbon atom doubly bonded to an oxygen atom and each of said cyclohexene rings having its two unsaturated carbon atoms directly opposite the aforementioned two adjacent carbon atoms of the chain, said cyclohexene ring being linked to one another through the carbon atoms of the rings other than the carbon atoms on the chains.

This polymer is prepared by cross linking a stable chain polymer composition capable of being cross linked by the application of heat, alone, which comprises an intimate admixture of a chain polymer containing ethylenic linkages between pairs of adjacent carbon atoms, at least one of the carbon atoms of each pair being also adjacent to a carbon atom doubly bonded to an oxygen atom and a cross linking agent of the group consisting of compounds containing at least two pairs of conjugated ethylenic linkages and compounds decomposable by heat to produce compounds containing at least two pairs of conjugated ethylenic linkages.

The formation of ring closures between the ethylenic linkages of the chain polymer and the conjugated ethylenic linkages of the cross linking agent is in accordance with the well known Diels-Alder reaction wherein dienes add on to a pair of ethylenically linked carbon atoms to produce a cyclohexene ring, at least one of the ethylenically linked carbon atoms being also linked to a carbon atom doubly bonded to an oxygen atom. Preferably both of the ethylenically linked carbon atoms are also linked to carbon atoms doubly bonded to an oxygen atom.

The addition of maleic anhydride or maleate esters to 1,3 butadiene is typical of the Diels-Alder reaction. In the case of maleic anhydride the reaction proceeds quantitatively at 100° in the presence of a solvent as follows:

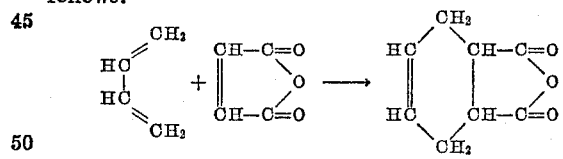

Therefore, in accordance with one aspect of this invention, a hydrogen atom on one of the terminal carbon atoms of the butadiene could be substituted by the remainder of the molecule of the cross linking agent, which contains at least one additional conjugated pair of ethylenic linkages and the maleic ester moiety in the polyester resin reacts therewith, as follows, with $R_1$, $R_2$, $R_3$, and $R_4$ being divalent dehydroxylated residues of dihydric alcohols and the dotted lines indicating molecular linkages.

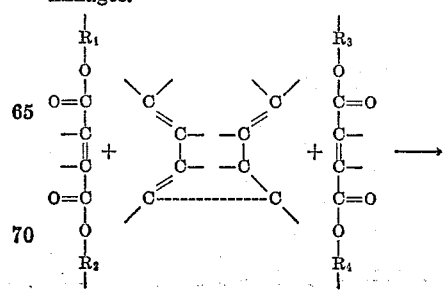

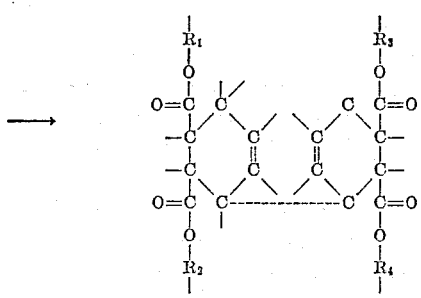

In a preferred modification, the maleic anhydride residue in the polyester chain molecule is obtained by utilizing maleic anhydride as at least a portion of the esterifying agent for the dihydric alcohol, such as 1,2 propylene glycol. Preferably, another difunctional acid which does not contain ethylenic unsaturation, such as phthalic anhydride, is also used to react with a portion of the glycol.

It is to be noted that the term "acid" as used herein also encompasses the anhydride.

Among the acids without ethylenic unsaturation which may be used are phthalic acid, isophthalic acid, terephthalic acid, adipic acid, sebacic acid, tetrachlorophthalic acid, succinic, azelaic, glutaric, pimelic, 3,3'oxy dipropionic acid and mixtures thereof. These acids are preferably used in molar proportions from about 0% to 90%, based on the total number of moles of diacid used.

In place of maleic anhydride or maleic acid, other difunctional acids having $\alpha,\beta$ unsaturation may be reacted with glycols to produce polyesters with ethylenically unsaturated linkages adjacent to carbon atoms which are doubly bonded to oxygen atoms. Among these acids are fumaric acid, methyl maleic acid, methyl fumaric acid, itaconic acid, dimethylmaleic acid, glutaconic acid, chlormaleic acid, and dichlormaleic acid.

It is to be noted that some $\alpha,\beta$ unsaturated acids, such as glutaconic acid produce polymers having only one carbonyl group adjacent to the ethylenic unsaturation. Some $\alpha,\beta$ unsaturated acids, such as itaconic acid produce polymers having ethylenic unsaturation in branches of the chain. Such polymers are within the scope of this invention as well as polymers having ethylenic unsaturation in the linear chain itself.

In addition to the 1,2-propylene glycol mentioned above, other dihydric alcohols may be used in the preparation of polyesters. Among the dihydric alcohols which may be used are ethylene glycol; diethylene glycol; triethylene glycol; 1,3-propylene glycol, dipropylene glycol (1,2), dipropylene glycol (1,3), 2,3-butylene glycol, styrene glycol and neopentyl glycol. Halogenated glycols such as 2,2 bis choromethyl-1,3, propanediol and 2,2 bis bromomethyl 1,3 propanediol may also be used.

It is to be noted that dihydric alcohols containing ether linkages, such as diethylene glycol, may be used. It is also within the scope of this invention to use as a dihydric alcohol, a derivative of a more highly hydroxylated compound, such as a monoether or a monoester of glycerin.

Polymers which may be cross linked in accordance with the present invention need not be polyesters prepared from dihydric alcohols and difunctional acids. Other chain polymers may be used which contain ethylenic linkages between pairs of adjacent carbon atoms of which carbon atoms at least one is adjacent to a carbon atom doubly bonded to an oxygen atom.

For example, a polyvinyl alcohol polymer may be partially esterified with an $\alpha,\beta$ unsaturated acid such as acrylic acid, methacrylic acid, maleic acid or crotonic acid to produce ethylenic linkages and ester linkages in side chains. In another modification, a naturally occurring macromolecule containing hydroxy groups, such as cellulose, may be partially esterified with an unsaturated acid.

The cross linking agents used in accordance with this invention are compounds which have at least two pairs of conjugated ethylenic linkages or compounds which decompose by heat to produce compounds having at least two pairs of conjugated ethylenic linkages. The cross linking agents should be sufficiently compatible with the polymer to permit intimate admixture and preferably should form a solution with the polymer.

The conjugated ethylene linkages may be in cyclic non-benzenoid portions of a molecule or in acyclic portions, or in both. Molecules containing two or more furan rings, thiophene rings or cyclopentadiene rings are suitable. Molecules containing two or more modified butadiene groups, such as glycol disorbates may also be used. Among the specific compounds containing two or more pairs of conjugated ethylenic linkages which may be used are hydrofuramide, ethylene glycol disorbate, and methylene bis pentadienoic amide.

Other linking agents may be used which do not contain two or more pairs of conjugated ethylenic linkages, but which decompose when heated to the curing temperature to produce compounds which have such linkages. For example, polyethylene dicyclopentadiene dicarboxylate may be used since it decomposes at 180° C. to produce ethylene glycol di(cyclopentadiene carboxylate) which has two cyclopentadiene rings.

The cross linking agent is admixed with the chain polymer which is preferably in liquid phase. Some polyesters are normally liquid. Others fuse below curing temperature and may be blended with the cross linking agent at somewhat elevated temperatures above the fusion temperature. Even where the fusion temperature is above the minimum curing temperature the cross linking agent may be admixed with the fused polymer provided that the admixture is sufficiently rapid so that substantial cross linking does not take place before uniform and intimate admixture is obtained. In such cases, it is preferred to cool the admixture rapidly unless immediate fabrication to final form is desired.

If desired, the polymer and the cross linking agent may be dissolved in a suitable mutual solvent. In some cases the cross linking agent may be intimately admixed with a polymer which is dispersed in the form of small particles in a suitable non-solvent liquid.

In the case of elastomeric chain polymers, the cross linking agent may be admixed with the polymer while it is being worked on a pair of cooled rolls.

Molding powders of chain polymers may be blended with powdered cross linking agent. However, because of the difficulty of obtaining uniform distribution, it is preferred to blend the cross linking agent into fused polymers where possible and thereafter to comminute the admixture to suitable particle size.

The proportionate amount of cross linking agent will depend on the particular cross linking agent used, on the number of ethylenic linkages in the polymer and on the degree of cross linking desired. In general, the proportion will vary from about 10 to about 60 weight percent of cross linking agent per unit weight of chain polymer.

The cross linking, or curing temperature may vary from about 120° to about 200° C. and preferably from about 150° to about 185° C. The time of curing may vary from about 30 minutes to about 300 minutes, and preferably from about 60 minutes to about 90 minutes.

*Example 1*

13.1 parts by weight of a polycondensate of 1 mole of maleic anhydride, 0.945 mole of 1,2-propylene glycol and 0.105 mole of 2,3-butylene glycol containing a small amount of hydroquinone as a stabilizer, was blended with 10.0 parts by weight of polyethylene dicyclopentadiene dicarboxylate. The reactants were blanketed with nitrogen and the vessel was stoppered and placed in an oil bath at 185° to 195° C. for a period of 90 minutes.

The liquid mixture was converted to a brown, rubbery solid.

The reaction produced a cross linked polyester containing the structure

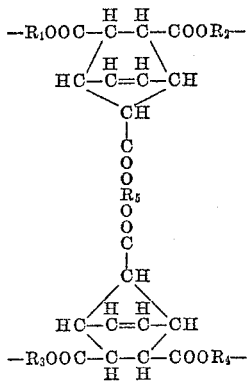

wherein $R_1$, $R_2$, $R_3$, and $R_4$ are divalent residues of dehydroxylated dihydric alcohols and $R_5$ is an ethylene radical.

*Example 2*

11 parts by weight of a polycondensate of 1 mole of phthalic anhydride, 1 mole of maleic anhydride and 2 moles of 1,2-propylene glycol, containing a small amount of hydroquinone as a stabilizer, was blended with 6 parts by weight of polyethylene dicyclopentadiene dicarboxylate. The reactants were blanketed with nitrogen and the vessel was stoppered and placed in an oil bath at 185° to 195° C. for a period of 300 minutes. The liquid mixture was converted to a gel, indicating cross linking.

*Example 3*

15.0 parts by weight of the polycondensate of Example 1 was blended with 7.5 parts by weight of hydrofuramide. The reactants were blanketed with nitrogen and the vessel was stoppered and placed in an oil bath at 175° C. for a period of 60 minutes. The liquid polymer was converted to a brown rigid solid.

The reaction produced a cross linked polyester containing the structure:

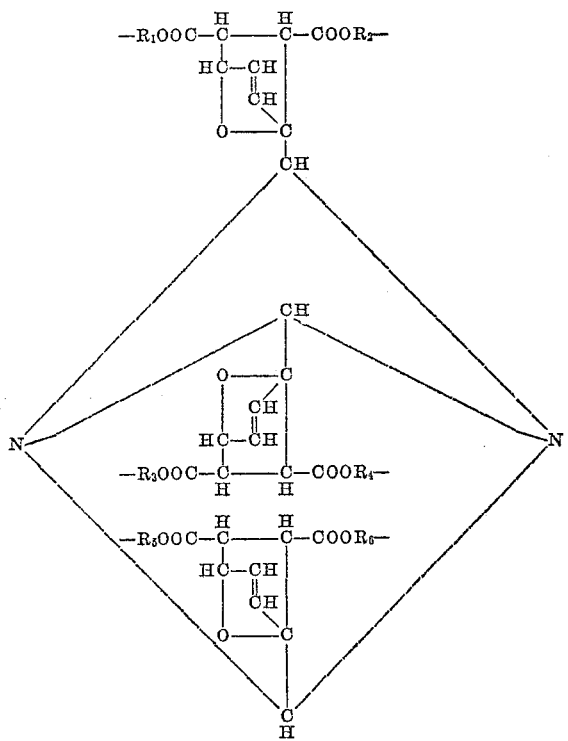

wherein $R_1$, $R_2$, $R_3$, $R_4$, $R_5$, and $R_6$ are divalent dehydroxylated residues of dihydric alcohols.

It is to be understood that the foregoing detailed description is merely given by way of illustration and that many variations may be made therein without departing from the spirit of our invention.

Having described our invention, what we desire to secure by Letters Patent is:

1. A cross linked polyester polymer comprising a plurality of chains containing carbon atoms linked to other carbon atoms through oxygen atoms by ester linkages and containing carbon atoms directly linked to other carbon atoms, said chains being linked together by a structure which with two adjacent carbon atoms of each of a plurality of chains forms cyclohexene rings, at least one of said adjacent carbon atoms of each pair being also adjacent to a carbon atom in the chain linked by an ester linkage and each of said cyclohexene rings having its two unsaturated carbon atoms directly opposite the aforementioned two adjacent carbon atoms of the chain, said cyclohexene rings being linked to one another through carbon atoms of the rings which are adjacent to the carbon atoms in the chains wherein the four carbon atoms of the cyclohexene ring which are not in the chain are also part of a five-membered ring wherein the fifth member is selected from the group consisting of carbon, oxygen and sulfur atoms.

2. A cross linked polyester containing the structure

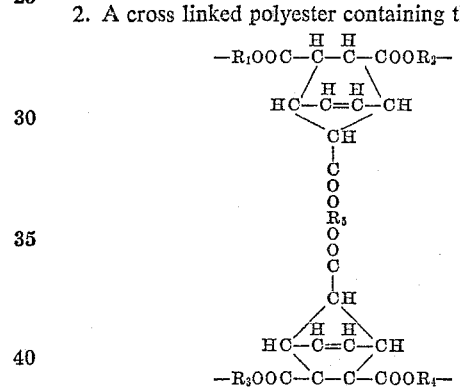

wherein $R_1$, $R_2$, $R_3$, and $R_4$ are divalent dehydroxylated residues of dihydric alcohols and $R_5$ is an ethylene radical.

3. A cross linked polyester containing the structure

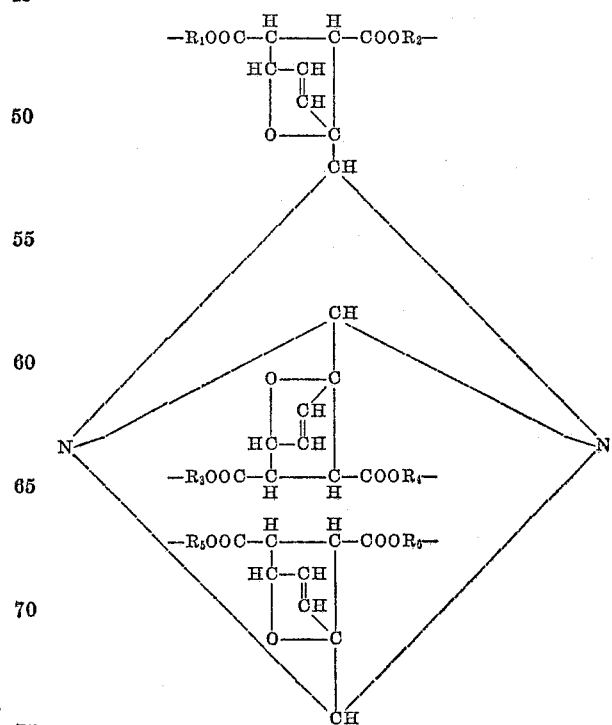

wherein $R_1$, $R_2$, $R_3$, $R_4$, $R_5$, and $R_6$ are divalent dehydroxylated residues of dihydric alcohols.

4. The cross linked polymer of claim 2 wherein $R_1$, $R_2$, $R_3$, and $R_4$ are ethylene groups.

5. The cross linked polymer of claim 2 wherein $R_1$, $R_2$, $R_3$, and $R_4$ are 1,2-propylene groups.

6. A cross linked polyester polymer prepared by heating a mixture containing (a) a polycondensate of maleic anhydride, 1,2-propylene glycol and 2,3-butylene glycol and (b) polyethylene dicyclopentadiene dicarboxylate.

7. A stable polyester chain polymer composition capable of being cross linked by the application of heat, alone, which comprises an intimate admixture of a chain polymer containing carbon atoms linked to other carbon atoms through oxygen atoms by ester linkages and containing carbon atoms directly linked to other carbon atoms including some carbon atoms, adjacent to carboxyl groups of the ester linkages, which are linked directly to other carbon atoms by ethylenic linkages and a cross linking agent selected from the group consisting of compounds containing at least two pairs of conjugated ethylenic linkages each pair being on a ring of the group consisting of cyclopentadiene rings, thiophene rings and furan rings and compounds decomposable by heat to produce compounds containing at least two pairs of conjugated ethylenic linkage each pair being on a cyclopentadiene ring.

8. A stable polyester chain polymer composition capable of being cross linked by the application of heat, alone, which comprises hydrofuramide and a reaction product of phthalic anhydride and maleic anhydride with 1,2-propylene glycol.

9. A stable polyester chain polymer composition capable of being cross linked by the application of heat alone, which comprises polyethylene dicyclopentadiene dicarboxylate and a reaction product of phthalic anhydride and maleic anhydride with 1,2 propylene glycol.

10. A method of cross linking a polyester chain polymer containing carbon atoms linked to other carbon atoms through oxygen atoms by ester linkages and containing carbon atoms, directly linked to other carbon atoms, including some carbon atoms, adjacent to carboxyl groups of the ester linkages, which are linked directly to other carbon atoms by ethylenic linkages, which comprises intimately admixing said polymer with a cross linking agent selected from the group consisting of compounds containing at least two pairs of conjugated ethylenic linkages each pair being on a ring of the group consisting of cyclopentadiene rings, thiophene rings and furan rings and compounds decomposable by heat to produce compounds containing at least two pairs of conjugated ethylenic linkages each pair being on a cyclopentadiene ring and heating the admixture thus obtained to produce ring closures between the ethylenic linkages of the polyester polymer and the conjugated ethylenic linkages of the cross linking agent.

11. A method of cross linking a polyester polymer containing the structure

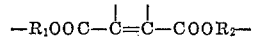

wherein $R_1$ and $R_2$ are divalent dehydroxylated, residues of dihydric alcohols, which comprises intimately admixing said polymer with a cross linking agent selected from the group consisting of compounds containing at least two pairs of conjugated ethylenic linkages each pair being on a ring of the group consisting of cyclopentadiene rings, thiophene rings and furan rings and compounds decomposable by heat to produce compounds containing at least two pairs of conjugated ethylenic linkages each pair being on a cyclopentadiene ring and heating the admixture thus obtained to produce ring closures between the ethylenic linkages of the polyester polymer and the conjugated ethylenic linkages of the cross linking agent.

12. The method of claim 11 wherein $R_1$ and $R_2$ are ethylene groups.

13. The method of claim 11 wherein $R_1$ and $R_2$ are 1,2 propylene groups.

14. A method of cross linking a polyester polymer containing the structure

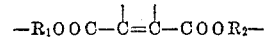

wherein $R_1$ and $R_2$ are divalent dehydroxylated residues of dihydric alcohols which comprises intimately admixing said polymer with hydrofuramide and heating the admixture thus obtained to produce ring closures between the ethylenic linkages of the polyester polymer and the conjugated ethylenic linkages of the hydrofuramide.

15. A method of cross linking a polyester polymer containing the structure

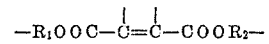

wherein $R_1$ and $R_2$ are divalent dehydroxylated residues of dihydric alcohols which comprises intimately admixing said polymer with polyethylene dicyclopentadiene dicarboxylate, heating the admixture to decompose the polyethylene dicyclopentadiene dicarboxylate and produce ethylene glycol dicyclopentadiene carboxylate and to thereafter form ring closures between the ethylenic linkages of the polyester polymer and the conjugated ethylenic linkages of the ethylene glycol dicyclopentadiene carboxylate.

16. A stable polyester chain polymer composition capable of being cross linked by the application of heat, alone, which comprises an intimate admixture of a polyester polymer containing the structure

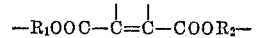

wherein $R_1$ and $R_2$ are divalent dehydroxylated residues of dihydric alcohols and a cross linking agent of the group consisting of compounds containing at least two pairs of conjugated ethylenic linkages, each pair being on a ring of the group consisting of cyclopentadiene rings, thiophene rings and furan rings, and compounds decomposable by heat to produce compounds containing at least two pairs of conjugated ethylenic linkages on a cyclopentadiene ring.

References Cited in the file of this patent

UNITED STATES PATENTS

| | | |
|---|---|---|
| 2,280,242 | Kropa | Apr. 21, 1942 |
| 2,404,836 | Gerhart et al. | July 30, 1946 |
| 2,671,070 | Knapp | Mar. 2, 1954 |
| 2,870,112 | Mertzweiller | Jan. 20, 1959 |
| 2,881,144 | Cohen et al. | Apr. 7, 1959 |

FOREIGN PATENTS

| | | |
|---|---|---|
| 160,120 | Australia | Dec. 6, 1954 |

OTHER REFERENCES

"Surface Coatings and Finishes," Gordon et al., Chemical Publishing Company, Inc., New York, New York (1954), page 23 relied on.

"The Chemical Constitution of Natural Fats" (2nd edition), Hilditch, published by John Wiley and Sons, Inc., New York (1949), page 241 relied on.

Hackh's Chemical Dictionary (3rd edition), published by the Blakiston Company, Philadelphia, Pa. (1944), page 270 relied on.